(12) United States Patent
Miller, Jr.

(10) Patent No.: US 6,650,252 B2
(45) Date of Patent: Nov. 18, 2003

(54) VEHICLE WARNING SYSTEM AND METHOD

(75) Inventor: T. Steven Miller, Jr., Novi, MI (US)

(73) Assignee: Delphi Technologies, Inc., Troy, MI (US)

( * ) Notice: Subject to any disclaimer, the term of this patent is extended or adjusted under 35 U.S.C. 154(b) by 78 days.

(21) Appl. No.: 09/940,945

(22) Filed: Aug. 28, 2001

(65) Prior Publication Data
US 2003/0043059 A1 Mar. 6, 2003

(51) Int. Cl.⁷ .............................................. G08G 1/123
(52) U.S. Cl. ..................... 340/989; 340/988; 340/995
(58) Field of Search ................................ 340/988, 989, 340/995, 902, 905; 701/117, 200

(56) References Cited

U.S. PATENT DOCUMENTS

| | | | |
|---|---|---|---|
| 4,706,086 A | 11/1987 | Panizza | |
| 5,353,023 A | * 10/1994 | Mitsugi | 340/989 |
| 5,428,544 A | 6/1995 | Shyu | |
| 5,636,245 A | * 6/1997 | Ernst et al. | 375/259 |
| 5,699,056 A | * 12/1997 | Yoshida | 340/905 |
| 5,841,367 A | 11/1998 | Giovanni | |
| 6,121,896 A | 9/2000 | Rahman | |
| 6,150,961 A | * 11/2000 | Alewine et al. | 340/995 |
| 6,166,657 A | * 12/2000 | Mann | 340/905 |
| 6,178,374 B1 | * 1/2001 | Mohlenkamp et al. | 701/117 |
| 6,236,337 B1 | 5/2001 | Beier et al. | |
| 6,249,232 B1 | * 6/2001 | Tamura et al. | 340/902 |
| 6,255,942 B1 | * 7/2001 | Knudsen | 340/506 |
| 6,337,641 B1 | * 1/2002 | Yoshioka et al. | 340/989 |
| 6,359,571 B1 | * 3/2002 | Endo et al. | 340/988 |
| 6,374,177 B1 | * 4/2002 | Lee et al. | 701/200 |

FOREIGN PATENT DOCUMENTS

| | | |
|---|---|---|
| DE | 19651143 A1 | 12/1996 |
| DE | 19740602 A1 | 9/1997 |
| EP | 0627719 A2 | 3/1994 |
| EP | 0897168 A2 | 6/1998 |
| EP | 0959442 A2 | 11/1999 |
| GB | 2349000 | 4/1999 |
| GB | 2358506 | 1/2001 |
| JP | 06180795 | 12/1992 |
| WO | WO91/16699 | 4/1991 |

OTHER PUBLICATIONS

European Search Report 02078140.7-1248- Jan. 8, 2003.

* cited by examiner

Primary Examiner—John Tweel
(74) Attorney, Agent, or Firm—Scott A. McBain

(57) ABSTRACT

A vehicle warning system and method. A detector is onboard a first vehicle and automatically detects a travel condition problem encountered by the first vehicle at a first location. A vehicle position locator automatically determines the first location of the first vehicle. A communicator automatically transmits the determined first location and the detected travel condition problem to a second location. In one example, the vehicle is an automotive vehicle, and the second location is a communications center which transmits the determined first location and the detected travel condition problem (such as an icy roadway or a traffic jam) to only those other vehicles headed toward the first location.

9 Claims, 2 Drawing Sheets

VEHICLE WARNING SYSTEM AND METHOD

TECHNICAL FIELD

The present invention relates generally to vehicles, and more particularly to a vehicle warning system and method.

BACKGROUND OF THE INVENTION

Drivers of automotive vehicles are warned of travel conditions such as traffic jams and icy roads by a number of known methods. In one known method, a driver calls a local radio station on a car cell phone to report a traffic jam or a patch of ice at a particular roadway location. The local radio station then broadcasts this traffic news to all drivers having car radios tuned in to that station so that all such drivers are warned ahead of time of the impending traffic jam or icy patch. In another known method, a radio reporter in an airborne traffic helicopter sees a traffic jam and reports this traffic news on air over a local radio station broadcast. In an additional known method, observed traffic jams and icy roads will be reported to a service, such as the OnStar Virtual Advisor service which uses an automobile's Global Positioning System to determine an automobile's location. A subscribing driver will voice activate the service over a wireless communications system which will respond with real-time reports on traffic and road conditions tailored to the particular location of the automobile of the subscribing driver. In another feature of the service, the automobile of a subscriber automatically transmits a vehicle rollover condition to the service which will summon help to the automobile's location.

What is needed is an improved vehicle warning system, such as an improved automotive vehicle warning system.

SUMMARY OF THE INVENTION

In a first expression of a first embodiment of the invention, a vehicle warning system includes a detector, a vehicle position locator, and a communicator. The detector is onboard a first vehicle and automatically detects a travel condition problem encountered by the first vehicle at a first location. The vehicle position locator automatically determines the first location of the first vehicle. The communicator automatically transmits the determined first location and the detected travel condition problem to a second location.

In a second expression of a first embodiment of the invention, a vehicle warning system includes a detector, a vehicle position locator, and a communicator. The detector is onboard a first automotive vehicle and automatically detects a loss of traction event encountered by the first vehicle at a first location. The vehicle position locator automatically determines the first location of the first vehicle. The communicator is onboard the first automotive vehicle and transmits the determined first location and the detected low traction event to a communications center remote from the first automotive vehicle.

In a third expression of a first embodiment of the invention, a vehicle warning system includes a detector, a vehicle position locator, and a communicator. The detector is onboard a first automotive vehicle and automatically detects a traffic jam event encountered by the first vehicle at a first location. The vehicle position locator automatically determines the first location of the first vehicle. The communicator is onboard the first automotive vehicle and transmits the determined first location and the detected traffic jam to a communications center remote from the first automotive vehicle.

A first method of the invention is for warning a second vehicle of a travel condition problem encountered by a first vehicle at a first location. The first method includes steps a) through e). Step a) includes receiving a vehicle operating parameter sensed by a vehicle sensor onboard the first vehicle. Step b) includes identifying a travel condition problem based at least in part on the received vehicle operating parameter. Step c) includes determining the first location of the first vehicle. Step d) includes determining the travel path of the second vehicle. Step e) includes communicating the determined first location and the identified travel condition problem to the second vehicle only when the determined travel path of the second vehicle is headed toward the determined first location.

Several benefits and advantages are derived from one or more of the first method and the first, second and third expressions of a first embodiment of the invention. By using an onboard detector (such as a vehicle sensor and a computer) to detect a travel condition problem (such as a low traction roadway or a traffic jam) of a vehicle at a particular location, and by using a communicator to transmit (such as to another vehicle headed toward the particular location) such travel condition problem, a roadway or traffic travel condition problem can be quickly reported without requiring human observation or action. In one example, only vehicles determined to be headed toward the particular location are alerted of the travel condition problem which reduces unwanted information overload to those vehicles which are not headed toward the particular location.

DESCRIPTION OF THE PREFERRED EMBODIMENTS

Figure 1:
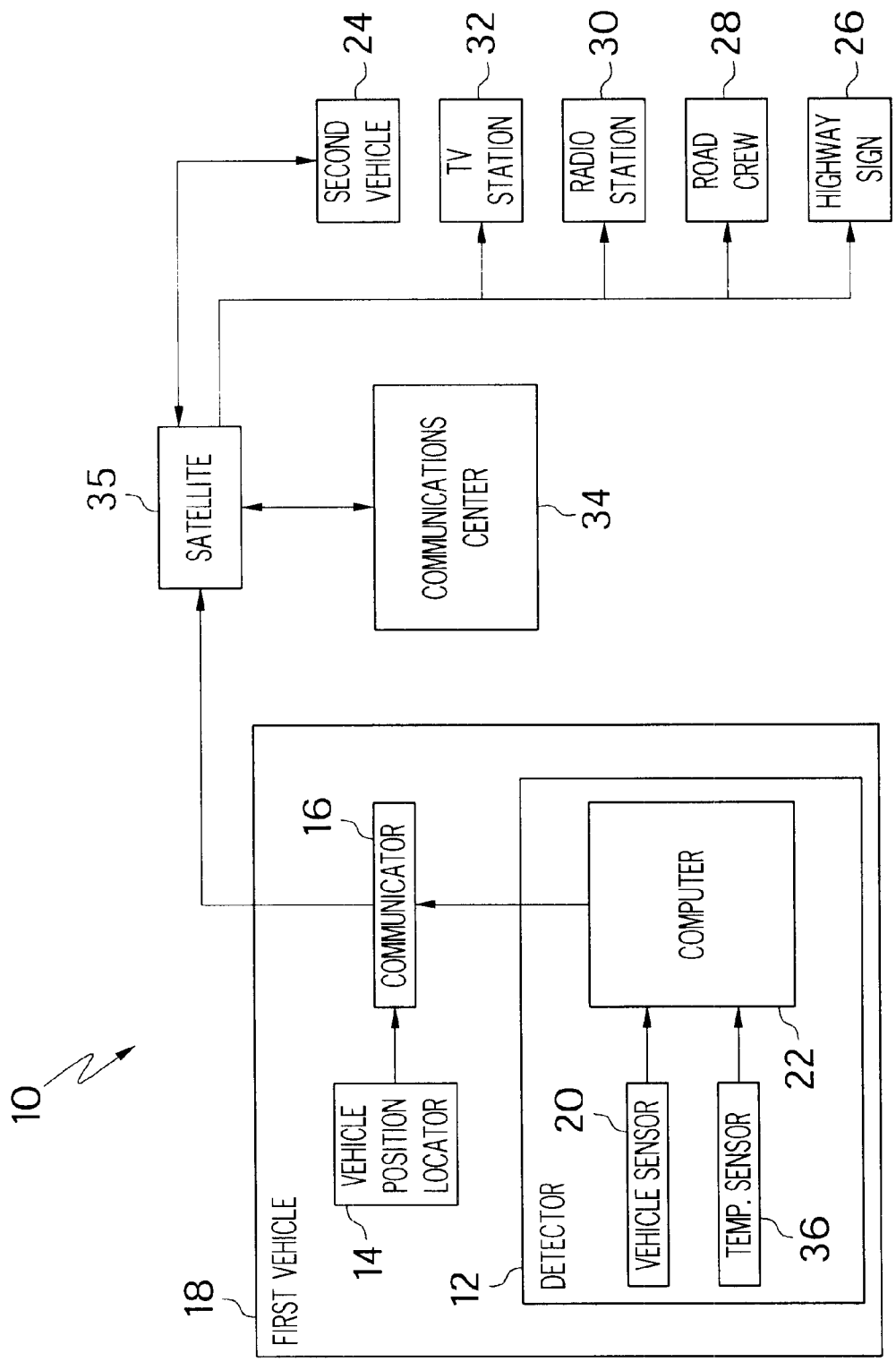
FIG. 1 is a block diagram of a first embodiment of the vehicle warning system of the invention.

Referring now to the drawings, FIG. 1 illustrates a first embodiment of the present invention. In a first expression of the first embodiment shown in FIG. 1, a vehicle warning system 10 includes a detector 12, a vehicle position locator 14, and a communicator 16. The detector 12 is onboard a first vehicle 18 and automatically detects a travel condition problem encountered by the first vehicle at a first location. A travel condition problem is a problem encountered by the first vehicle which would also affect the travel of other vehicles passing through the first location. The vehicle position locator 14 automatically determines the first location of the first vehicle. The communicator 16 automatically transmits the determined first location and the detected travel condition problem to a second location. It is noted that a communicator 16 is any device which automatically transmits the determined first location and the detected travel condition problem to a second location.

Examples, without limitation, of vehicles include automotive vehicles, boats, airplanes, etc. Examples, without limitation, of automotive travel condition problems include loss of traction, an icy roadway (which is a particular loss of traction problem), traffic jams, fog (which is a particular traffic jam problem), etc. Examples of travel condition problems for airplanes include, without limitation, clear air turbulence. Examples of travel condition problems for boats and other vehicles are left to the artisan.

In one example, the detector itself detects the travel condition problem such as ice formation on a flying aircraft. In another example, the detector 12 includes at least one vehicle sensor 20 and a computer 22. The at least one vehicle sensor 20 is onboard the first vehicle 18 and senses a vehicle operating parameter at the first location. A vehicle operating parameter is a parameter which describes the operation of a particular vehicle as opposed to describing the physical environment of the particular vehicle. The computer 22 is onboard the first vehicle 18 and detects the travel condition problem based at least in part on the sensed vehicle operating parameter. In one variation, the travel condition problem is detected based on a plurality of different vehicle operating parameters, as can be appreciated by the artisan.

Examples, without limitation, of automotive vehicle operating parameters include wheel speed for each wheel, brake switch activation, vehicle speed, acceleration, deceleration (which is the negative of acceleration), wheel axle torque, yaw rate, steering wheel angle, wheel slippage, etc. One of more of these vehicle operating parameters is available from automotive ABS (anti-lock breaking systems) systems, VSE (vehicle stability enhancement) systems, PCM (powertrain control module) systems, BCM (body control module) systems, and/or TCS (traction control system) systems, as is understood by those skilled in the art. Examples of vehicle operating parameters for boats, airplanes and other vehicles are left to the artisan.

One example of a vehicle position locator 14 is a GPS (global positioning system) system. Other examples of vehicle position locators are left to the artisan and include roadway sensors identifying a particular passing automotive vehicle, etc.

In one implementation, the first vehicle 18 is a first automotive vehicle. In one variation, the second location is a second vehicle 24 which is an automotive vehicle in the vicinity of the determined first position. In another variation, the second location is a programmable highway sign 26, a road crew 28, a radio station 30, or a television station 32. In a further variation, the second location is a communication center 34 remote from the first automotive vehicle 18. In one modification, the communication center 34 transmits a warning of the detected travel condition problem and the determined first location to the second vehicle 24, the programmable highway sign 26, the road crew 28, the radio station 30, and/or the television station 32.

In one design, the transmissions are wireless transmissions communicated over a satellite 35. In another design, the transmissions are wireless transmissions communicated locally or even over the Internet. In one example, the communicator 16 is an automotive portion of the OnStar Virtual Advisor service or a similar service, and the communications center 34 is a centralized portion of the OnStar Virtual Advisor service. Other examples of the communicator 16 and the communications center 34 are left to the artisan.

In one enablement to determine a low traction roadway, the automotive vehicle operating parameter includes wheel speed. In one example, the four sensed wheel speeds are compared with the vehicle speed calculated by the computer 22 to determine the amount of wheel slippage wherein the computer 22 detects the travel condition problem of a low traction roadway when the amount of determined wheel slippage exceeds a predetermined value. In one variation, the vehicle warning system 10 also includes a temperature sensor 36 which is onboard the first vehicle 18 and which measures the air temperature outside the first vehicle 18. In one modification, the computer 22 detects the travel condition problem of an icy roadway when the computer 22 detects a low traction roadway and the measured air temperature of the temperature sensor 36 is below freezing. Other algorithms to determine a low traction roadway are left to the artisan.

In one enablement to determine a traffic jam, the automotive vehicle operating parameter includes wheel speed. In one example, vehicle speed is calculated by the computer 22 from one or more of the four sensed wheel speeds. The computer 22 detects the travel condition problem of a traffic jam when the first determined location is along a limited access highway and when the calculated vehicle speed is below a predetermined value for a predetermined time and/or travel distance. In another enablement to determine a traffic jam, the automotive operating parameter includes brake switch activation. In one example, the number of brake switch activations and/or the total time of brake switch activation for a predetermined time and/or distance is calculated by the computer 22. The computer 22 detects the travel condition problem of a traffic jam when the first determined location is along a limited access highway and when the number and/or total time for the brakes exceeds preselected levels.

A second expression of the first embodiment of the invention shown in FIG. 1 is for a vehicle warning system 10. The vehicle warning system 10 includes a detector 12, a vehicle position locator 14, and a communicator 16. The detector 12 is onboard a first automotive vehicle 18 and automatically detects a loss of traction event encountered by the first vehicle 18 at a first location. The vehicle position locator 14 automatically determines the first location of the first vehicle 18. The communicator 16 is onboard the first automotive vehicle 18 and transmits the determined first location and the detected low traction event to a communications center 34 remote from the first automotive vehicle 18.

In one example, the detector 12 includes at least one vehicle sensor 20 and a computer 22. The at least one vehicle sensor 20 is onboard the first vehicle 18 and senses a vehicle operating parameter at the first location. The computer 22 is onboard the first vehicle and detects the low traction event based at least in part on the sensed vehicle operating parameter. In one design, the vehicle warning system 10 also includes a temperature sensor 36, and the computer 22 determines the low traction event is an icy roadway.

In the same or another example, the communications center 34 transmits the determined first location and the detected low traction event to other locations 24–32 only when a predetermined number of separate vehicles transmit a low traction event and substantially the same determined first location to the communications center 34. In one variation, the communications center 34 determines which other automotive vehicles are headed toward the determined first location and transmits the determined first location and the detected low traction event only to those other automotive vehicles which are determined to be headed toward the first location. In one modification, the communications center 34 (through an associated computer) determines the travel paths of other automotive vehicles identifying their positions to the communications center 34, wherein the communications center 34 broadcasts the warning to those of the other vehicles (such as to the second vehicle 24) whose travel paths are headed to the identified location of the first automotive vehicle 18. The terminology "headed toward" includes heading on the same road toward the location reported by the first vehicle 18 as well as heading along a different road toward an intersection with the reported road or within a predetermined number of intersections, miles, and/or minutes of the reported location.

A third expression of the first embodiment of the invention shown in FIG. 1 is for an automotive vehicle warning system 10. The automotive vehicle warning system 10 includes a detector 12, a vehicle position locator 14, and a communicator 16. The detector 12 is onboard a first automotive vehicle 18 and automatically detects a traffic jam event encountered by the first vehicle 18 at a first location. The vehicle position locator 14 automatically determines the first location of the first vehicle 18. The communicator 16 is onboard the first automotive vehicle 18 and transmits the determined first location and the detected traffic jam event to a communications center 34 remote from the first automotive vehicle 18.

In one example, the detector 12 includes at least one vehicle sensor 20 and a computer 22. The at least one vehicle sensor 20 is onboard the first vehicle 18 and senses a vehicle operating parameter at the first location. The computer 22 is onboard the first vehicle and detects the traffic jam event based at least in part on the sensed vehicle operating parameter. In one variation, the determined first location is along a limited access highway.

In the same or another example, the communications center 34 transmits the determined first location and the detected traffic jam event to other locations 24–32 only when a predetermined number of separate vehicles transmit a traffic jam event and substantially the same determined first location to the communications center 34. In one variation, the communications center 34 determines which other automotive vehicles are headed toward the determined first location and transmits the determined first location and the detected traffic jam event only to those other automotive vehicles which are determined to be headed toward the first location. In one modification, the communications center 34 (through an associated computer) determines the travel paths of other automotive vehicles identifying their positions to the communications center 34, wherein the communications center 34 broadcasts the warning to those of the other vehicles (such as to the second vehicle 24) whose travel paths are headed to the identified location of the first automotive vehicle 18.

Figure 2:
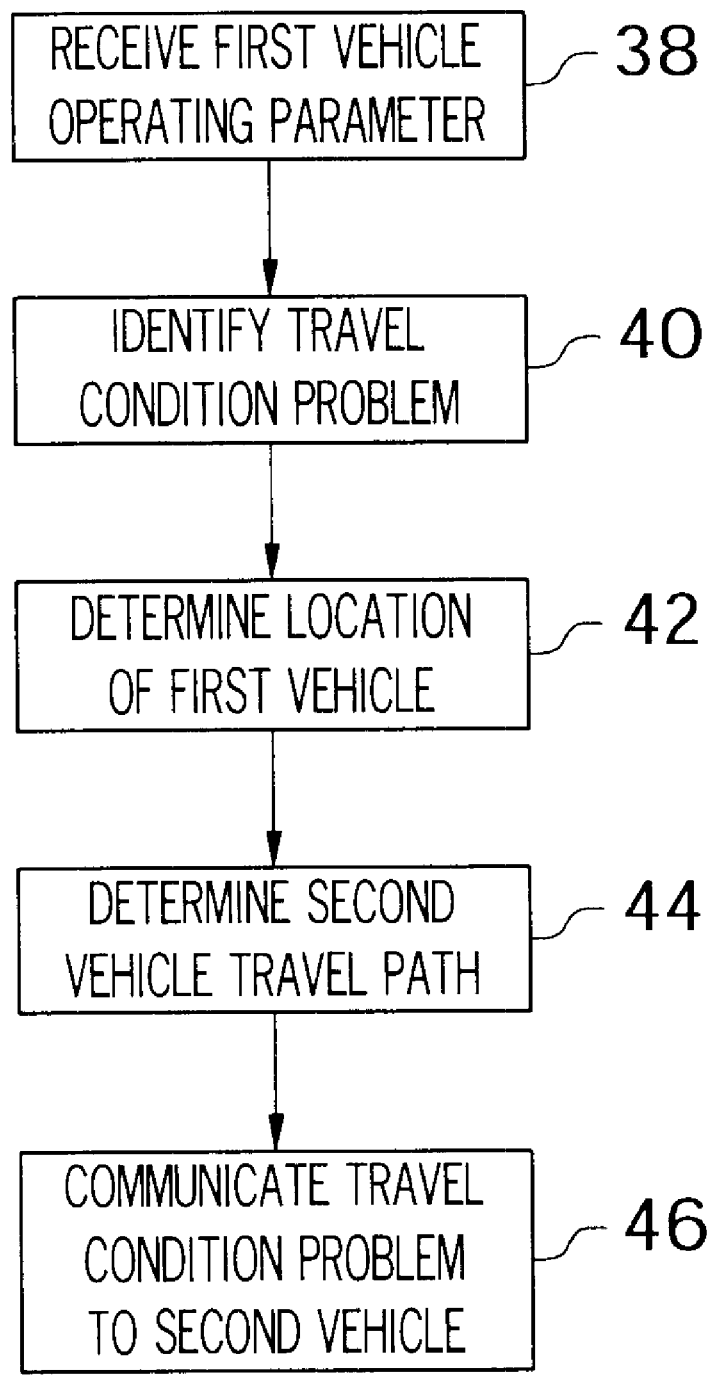
FIG. 2 is a flow chart of the steps of a first method of the invention for warning a second vehicle of a travel condition encountered by a first vehicle.

A method of the invention is for warning a second vehicle 24 of a travel condition problem encountered by a first vehicle 18 at a first location and is shown in FIG. 2. The method includes steps a) through e). Step a) is labeled as "Receive First Vehicle Operating Parameter" in block 38 of FIG. 2. Step a) includes receiving a vehicle operating parameter sensed by a vehicle sensor 20 onboard the first vehicle 18. Step b) is labeled as "Identify Travel Condition Problem" in block 40 of FIG. 2. Step b) includes identifying a travel condition problem based at least in part on the received vehicle operating parameter. Step c) is labeled as "Determine Location Of First Vehicle" in block 42 of FIG. 2. Step c) includes determining the first location of the first vehicle 18. Step d) is labeled as "Determine Second Vehicle Travel Path" in block 44 of FIG. 2. Step d) includes determining the travel path of the second vehicle 24. Step e) is labeled as "Communicate Travel Condition Problem To Second Vehicle" in block 46 of FIG. 2. Step e) includes communicating the determined first location and the identified travel condition problem to the second vehicle 24 only when the determined travel path is headed toward the identified location. In one implementation of the method, the first vehicle 18 is a first automotive vehicle and the second vehicle 24 is a second automotive vehicle. As previously noted, in one example, vehicle travel paths are determinable by a computer through GPS inputs, as is within the level of skill of the artisan.

The following is a further discussion of some aspects of one or more enablements of the invention. In one enablement, the intent of the system is to use information from a low traction event (ABS event, TCS event, VSE event, etc.) in conjunction with information from any other in-vehicle sensors (for example, but not limited to acceleration/deceleration, yaw-rate, temperatures, etc.) or other algorithm data, Global Positioning System technology (GPS), and inter-vehicle communications (OnStar or other type of communication) to warn drivers of a possible low traction situation on the road ahead.

In one example of this enablement, a driver comes to an icy intersection and hits the brakes. The vehicle enters ABS to try to stop the driver. This data, along with data such as deceleration levels from the control algorithm at the time of the stop and outside temperature or other useful information, would be processed by the computer to make an estimate of what surface the driver was on. In this case, the car would probably estimate ice. The vehicle position and direction on the planet would be noted using GPS. The information gathered from this system could then be sent to other cars, via OnStar or other form of inter-vehicle communication, such as satellites, to warn them about the conditions at that site. The signal could also be sent to automated road signs, road maintenance crews, radio stations, or other information system to inform people of the situation. Drivers of other cars, when approaching the same intersection would receive a warning of impending low traction conditions. In one variation, it is not intended for the system to tell all the cars that there is a low traction situation at a point; it is intended to only tell the cars headed towards that point of the road condition.

In the same or another enablement, the system would not only work for ABS, but also for TCS and VSE events. Several types of information are used to classify the low-traction condition so that people testing their ABS system, etc. won't set the system off. In the above example, deceleration was used in conjunction with the ABS data to determine that there was a slippery condition. If someone was just slamming on brakes to test their ABS system, high deceleration levels would indicate that there was enough available traction and not inform other vehicles.

In the same or another enablement, the warning that is sent to other vehicles could stay valid for a fixed amount of time after the event happens, or it could stay in effect as long as certain variables exist. For example, as long as the temperature stays below freezing, the signal could warn of ice at the intersection mentioned above, or it could turn off when say five cars don't have a low traction event at that point.

In another enablement, the system is used to inform drivers of possible traffic jams by noting the speeds of several other vehicles equipped with the system in the same area. Several vehicles with a speed slower than normal in the same area would indicate a traffic jam.

By informing the drivers of vehicles, such as with a speech warning, of possible dangerous situations on the road ahead, the drivers will be able to anticipate driving conditions before they encounter them.

The choice of specific travel conditions, sensors, and computer algorithms are left to the artisan. In one example to detect a traffic jam, vehicle speed is monitored as well as the number and/or length of time the brakes are applied. When criteria are satisfied, the system could send out a traffic jam flag. For example, one criteria is for the vehicle to be below 10 mph for ½ mile (3 minutes.) and during this time the brake has been applied 15 times or for a total of 1 minute. If several cars in the same area satisfy this criteria, a traffic jam warning is sent to other drivers. One criteria for turning off the warning is when a predetermined number of equipped vehicles pass the same spot without a traffic jam event.

Surface estimation can be made by using either an accelerometer or by calculating acceleration from the reference velocities that are calculated in ABS and TCS. By knowing the vehicle acceleration and the fact that the vehicle has lost traction, the system can estimate what surface it is on by using tables, as is known to the artisan. In one example, VSE uses a lateral accelerometer at the time the vehicle loses traction and a look up table to estimate the road surface. Using the vehicle speed and the amount of time it took the vehicle to accelerate, stop, or recover could give an estimation of how large the affected area is. Vehicle speed is currently calculated during TCS and ABS events.

Several benefits and advantages are derived from one or more of the first method and the first, second and third expressions of a first embodiment of the invention. By using an onboard detector (such as a vehicle sensor and a computer) to detect a travel condition problem (such as a low traction roadway or a traffic jam) of a vehicle at a particular location, and by using a communicator to transmit (such as to another vehicle headed toward the particular location) such travel condition problem, a roadway or traffic travel condition problem can be quickly reported without requiring human observation or action. In one example, only vehicles determined to be headed toward the particular location are alerted of the travel condition problem which reduces unwanted information overload to those vehicles which are not headed toward the particular location.

The foregoing description of a method and several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A method for warning a second vehicle of a travel condition problem encountered by a first vehicle at a first location comprising the steps of:
   a) receiving a vehicle operating parameter sensed by a vehicle sensor onboard the first vehicle;
   b) identifying the travel condition problem based at least in part on the received vehicle operating parameter;
   c) determining the first location of the first vehicle;
   d) determining the travel path of the second vehicle; and
   e) communicating the determined first location and the identified travel condition problem to the second vehicle only when the determined travel path of the second vehicle is headed toward the determined first location.

2. A vehicle warning system comprising:
   a) a detector which is onboard a first automotive vehicle and which automatically detects a loss of traction event encountered by the first vehicle at a first location;
   b) a vehicle position locator which automatically determines the first location of the first vehicle; and
   c) a communicator which is onboard the first automotive vehicle and which transmits the determined first location and the detected low traction event to a communications center remote from the first automotive vehicle,
   wherein the communications center determines which other automotive vehicles are headed toward the determined first location and transmits the determined first location and the detected low traction event only to those other automotive vehicles which are determined to be headed toward the first location.

3. The system of claim 2, wherein the detector includes at least one vehicle sensor and a computer, wherein the at least one vehicle sensor is onboard the first vehicle and senses a vehicle operating parameter at the first location, and wherein the computer is onboard the first vehicle and detects the low traction event based at least in part on the sensed vehicle operating parameter.

4. The system of claim 3, also including a temperature sensor, and wherein the computer determines the low traction event is an icy roadway.

5. The system of claim 2, wherein the communications center transmits the determined first location and the detected low traction event to other locations only when a predetermined number of separate vehicles transmit a low traction event and substantially the same determined first location to the communications center.

6. A vehicle warning system comprising:
   a) a detector which is onboard a first automotive vehicle and which automatically detects a traffic jam event encountered by the first vehicle at a first location;
   b) a vehicle position locator which automatically determines the first location of the first vehicle; and
   c) a communicator which is onboard the first automotive vehicle and which transmits the determined first location and the detected traffic jam to a communications center remote from the first automotive vehicle,
   wherein the communications center determines which other automotive vehicles are headed toward the determined first location and transmits the determined first location and the detected traffic jam event only to those other automotive vehicles which are determined to be headed toward the first location.

7. The system of claim 6, wherein the detector includes at least one vehicle sensor and a computer, wherein the at least one vehicle sensor is onboard the first vehicle and senses a vehicle operating parameter at the first location, and wherein the computer is onboard the first vehicle and detects the traffic jam event based at least in part on the sensed vehicle operating parameter.

8. The system of claim 6, wherein the determined first location is along a limited access highway.

9. The system of claim 8, wherein the communications center transmits the determined first location and the detected traffic jam event to other locations only when a predetermined number of separate vehicles transmit a traffic jam event and substantially the same determined first location to the communications center.

* * * * *